United States Patent
Vempati et al.

(10) Patent No.: US 12,423,306 B1
(45) Date of Patent: Sep. 23, 2025

(54) DYNAMICALLY PARTITION DATA

(71) Applicant: Amazon Technologies, Inc., Seattle, WA (US)

(72) Inventors: Yasaswi Vempati, Seattle, WA (US); Michael George Clarke, Leander, TX (US); Chetan Mehta, Seattle, WA (US); Jake Johnathan Ursetta, Highlands Ranch, CO (US)

(73) Assignee: Amazon Technologies, Inc, Seattle, WA (US)

( * ) Notice: Subject to any disclaimer, the term of this patent is extended or adjusted under 35 U.S.C. 154(b) by 36 days.

(21) Appl. No.: 17/548,346

(22) Filed: Dec. 10, 2021

(51) Int. Cl.
*G06F 16/2455* (2019.01)
*G06F 11/34* (2006.01)
*G06F 16/22* (2019.01)
*G06F 16/2458* (2019.01)

(52) U.S. Cl.
CPC .... *G06F 16/24556* (2019.01); *G06F 11/3409* (2013.01); *G06F 16/2282* (2019.01); *G06F 16/2462* (2019.01)

(58) Field of Classification Search
CPC ................................................ G06F 16/24556
USPC ........................................................ 707/769
See application file for complete search history.

(56) References Cited

U.S. PATENT DOCUMENTS

| | | | |
|---|---|---|---|
| 7,512,595 B1 | 3/2009 | McBride et al. | |
| 9,489,443 B1 | 11/2016 | Muniswamy-Reddy et al. | |
| 9,600,522 B2 * | 3/2017 | Schauer | G06F 16/2237 |
| 10,268,726 B1 | 4/2019 | Schiesser | |
| 10,360,199 B2 | 7/2019 | Korycki et al. | |
| 10,963,438 B1 * | 3/2021 | Dong | G06F 16/217 |
| 11,507,578 B2 * | 11/2022 | Arnold | G06F 16/24553 |
| 2003/0093772 A1 * | 5/2003 | Stephenson | G06F 11/3612 717/130 |
| 2004/0199533 A1 | 10/2004 | Celis et al. | |
| 2005/0060314 A1 | 3/2005 | Wang et al. | |
| 2008/0059408 A1 * | 3/2008 | Barsness | G06F 16/2471 707/E17.14 |
| 2010/0114976 A1 | 5/2010 | Castellanos et al. | |
| 2011/0055197 A1 * | 3/2011 | Chavan | G06F 16/2454 707/E17.017 |
| 2015/0235038 A1 | 8/2015 | Inoue et al. | |
| 2015/0286681 A1 * | 10/2015 | Baer | G06F 16/2282 707/754 |
| 2016/0026667 A1 | 1/2016 | Mukherjee et al. | |

(Continued)

FOREIGN PATENT DOCUMENTS

KR 2022-0038827 A 3/2022

OTHER PUBLICATIONS

USPTO Non-Final Office Action dated Jun. 8, 2023, U.S. Appl. No. 17/710,553, 17 pages.

(Continued)

*Primary Examiner* — Muluemebet Gurmu
(74) *Attorney, Agent, or Firm* — Davis Wright Tremaine LLP

(57) ABSTRACT

Techniques and systems can partition data with a partition key to provide data partitioned based on the partition key. Queries performed against the data partitioned based on the partition key can be queried to identify a query predicate shared by at least a plurality of the queries. That query predicate can be used to reparation the data to generate other partitioned data or to replace the data partitioned based on the partition key.

14 Claims, 7 Drawing Sheets

(56) References Cited

U.S. PATENT DOCUMENTS

| | | | |
|---|---|---|---|
| 2016/0253402 A1 | 9/2016 | Klots et al. | |
| 2018/0089262 A1* | 3/2018 | Bhattacharjee | ... G06F 16/24535 |
| 2019/0303465 A1* | 10/2019 | Shanmugamani | .... G06F 16/221 |
| 2020/0175011 A1* | 6/2020 | Viswanadha | ....... G06F 16/2471 |
| 2020/0211106 A1 | 7/2020 | Pan et al. | |
| 2021/0365300 A9 | 11/2021 | Kyaw et al. | |
| 2022/0121711 A1* | 4/2022 | Arnold | .............. G06F 16/24542 |
| 2023/0118982 A1 | 4/2023 | Collins, Jr. | |
| 2023/0161795 A1 | 5/2023 | Valt et al. | |

OTHER PUBLICATIONS

USPTO Non-Final Office Action dated Jan. 5, 2024, U.S. Appl. No. 17/710,557, 42 pages.
USPTO Non-Final Office Action dated Dec. 19, 2024, U.S. Appl. No. 17/710,557, 58 pages.
USPTO Final Office Action dated Jul. 8, 2024, U.S. Appl. No. 17/710,557, 50 pages.

* cited by examiner

| Employee ID | Last Name | Department | Hire Year |
|---|---|---|---|
| 1 | Jones | Accounting | 2009 |
| 3 | Andrews | Engineering | 2012 |
| 2 | Lawrence | HR | 2009 |
| 4 | James | Accounting | 2020 |

Partitioned Data (Accounting) 304

Partitioned Data (Engineering) 306

Partitioned Data (HR) 308

302

| Employee ID | Last Name | Department | Hire Year |
|---|---|---|---|
| 1 | Jones | Accounting | 2009 |
| 3 | Andrews | Engineering | 2012 |
| 2 | Lawrence | HR | 2009 |
| 4 | James | Accounting | 2020 |

Partitioned Data (2009) 312

Partitioned Data (2012) 314

Partitioned Data (2020) 316

DYNAMICALLY PARTITION DATA

BACKGROUND

Online service providers can provide distributed storage as a service to their customers. In an example, an online service provider can offer a service that ingests customer data that is stored on distributed storage. The service can process the ingested data to generate formatted data that can be queried to produce a subset of the formatted data relevant to a query. However, generating formatted data that can be queried efficiently and quickly is a difficult and challenging task. Data that is poorly formatted can create query bottlenecks resulting in inefficient use of compute resources.

BRIEF DESCRIPTION OF THE DRAWINGS

Various techniques will be described with reference to the drawings, in which:

FIG. 3 illustrates data of a table that can be partitioned, according to at least one embodiment;

DETAILED DESCRIPTION

Figure 1:
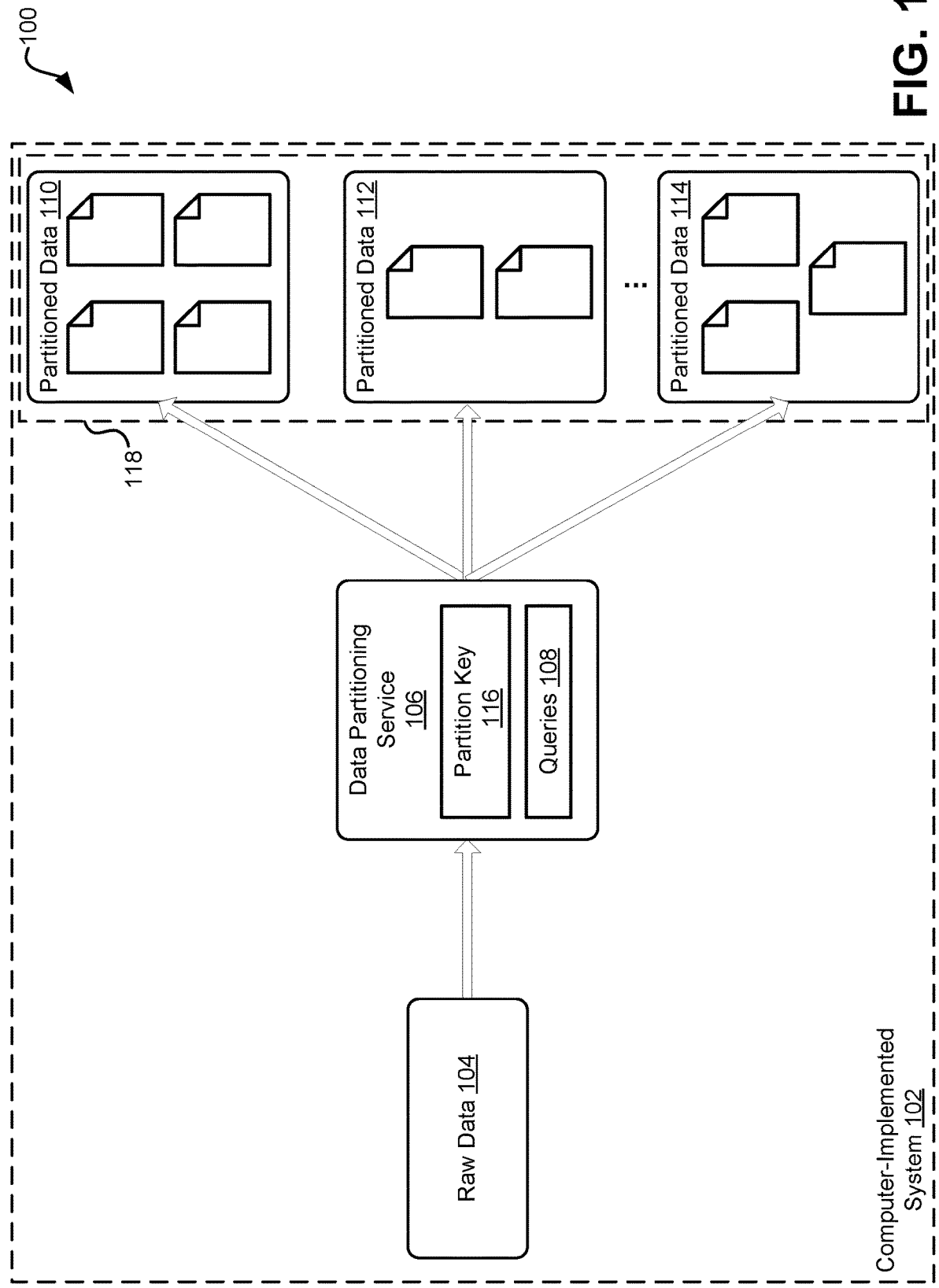
FIG. 1 illustrates an example system environment that can partition data, according to at least one embodiment.

Described techniques, systems, and apparatuses partition data used to process queries. Raw data can be received by compute resources of an organization, such as an online service provider. This raw data can be provided by a customer of the online service provider. The online service provider can process the raw data so that the data can be queried. However, processing raw data so it can be queried efficiently is often challenging, and the process can consume significant compute resources. Furthermore, queryable data, generated inefficiently, can create query bottlenecks and data churn, often resulting in unnecessary and wasteful use of compute resources. The described techniques, systems, and apparatuses aim to deliver queryable data that provides rapid query results while minimizing bottlenecks and data churn known to unnecessarily consume compute resources.

Raw data can be provided. A computer-implemented service can analyze the raw data to determine a table schema for the raw data. Based on the table schema, the computer-implemented service can assign an identifier to each data portion in the raw data. For example, the raw data can have several columns of data. The computer-implemented service can assign an identifier to each column of data included in the raw data. The computer-implemented service generates a table of data corresponding to the raw data, where the table includes the several columns of data, and respective columns of data have an assigned identifier. These assigned identifiers can be associated with metadata linked to the table of data.

The data of the table can be queried. However, queries against the data of the table can be inefficient because the entirety of the data should be processed in order to return comprehensive query results. Thus, it is beneficial to partition the data. By partitioning the data, the computer-implemented service can limit an amount of data scanned by each query, thus improving performance and reducing cost.

A partition key or other identifier can be used to partition data in the table. The partition key should correspond to a query predicate or search term that will occur frequently in search requests made against the data in the table. Unfortunately, such a query predicate or other search term or phrase is often unknown to the customer providing the raw data and the developer associated with the computer-implemented service that provides capability to query data. Therefore, customers and developers routinely select a less than optimum partition key to partition data in the table. One or more of the described implementations can dynamically select a partition key.

As described, raw data can be processed to generate a table of data. The table of data can be generated based on a table schema. This table schema can be stored in metadata associated with the table of data. The metadata can include identifiers associated with columns of data contained in the table of data. For example, a first identifier can be associated with a first column of data in the table of data and a second identifier can be associated with a second column of data in the table of data.

A computer-implemented service, provided by an online service provider, can subjectively or randomly select one of the first or second identifiers as the partition key or some other identifier that can be used to partition data in the table. Alternatively, a customer representative or developer of the online service provider can subjectively or randomly select one of the first or second identifiers as the partition key or some other identifier that can be used to partition the data in the table. The computer-implemented service can write the partition key to the metadata associated with the table of data.

The computer-implemented service can partition the data in the table based on the partition key. The process of partitioning the data in the table based on the partition key involves creating a logical split of the data into a plurality of partitions. In an example, each partition contains a subset of the data in the table. For example, partitioning the data in the table can involve allocating each row of the data in the table to one of the partitions determined based on the partition key.

Once the initial partitioning of the data in the table is achieved using the subjectively selected partition key, the computer-implemented service can process queries against the partitioned data. Each of the queries can be analyzed to determine an associated query predicate. For example, a query predicate associated with a query can be determined by analyzing a context of the query to determine a likely query predicate associated with the query. Specifically, words of the query can be parsed to determine a likely query predicate associated with the query. In another example, analysis of a query can determine that a word or phrase of the query corresponds to a query predicate. As an example, a user's query can include the natural language word pattern: "what are the sales orders for the last month." The computer-implemented service can analyze this natural language word pattern to determine the query predicate is likely "timestamp," based on a table of data that includes data corresponding to sales over some time or sales data accumulated in real time. In an example, the computer-implemented service includes a natural language translator, implemented by computer-executable instructions, to process natural language queries to generate query language, including at least a determined query predicate, recognizable by a database system hosting the data in the table. In another example, the query predicate can be determined directly from the query language. In an implementation, the query language identifies the query predicate, such as when the query language is written in a predefined format or schema recognized by a database system hosting the data in the table.

Query predicates associated with queries on the data of the table can be aggregated. Specifically, query predicates associated with queries on the data of the table can be aggregated or collected over some period of time. In an example, the computer-implemented service that processes queries against the partitioned data can aggregate the query predicates associated with those queries over a predetermined time period, such as a time period in minutes, hours, or days. The aggregated query predicates can be analyzed by the computer-implemented service to determine the most commonly occurring query predicate in the aggregated query predicates.

The determined most commonly occurring query predicate can be compared to the query predicate used to partition the data in the table. The computer-implemented service can make such a comparison. When the query predicate used to partition the data in the table corresponds to or matches the determined most commonly occurring query predicate, the computer-implemented service can ascertain that the query predicate chosen to partition the data in the table was suitably chosen. However, when the query predicate used to partition the data in the table does not correspond to or match the determined most commonly occurring query predicate determined from the aggregated queries, the computer-implemented system can partition (i.e., repartition) the data in the table. The computer-implemented system can partition the data in the table using the determined most commonly occurring query predicate. Partitioning the data in the table using the determined most commonly occurring query predicate can involve updating metadata of the table to include a partition key. Specifically, the most commonly occurring query predicate, in at least one implementation, is used as the partition key for the data in the table. In at least one example, the partition key is used to generate an additional data partition corresponding to the data of the table.

A computer-implemented service, provided by an online service provider, can provide multiple partitions of data corresponding to data in a table. The computer-implemented service can determine that a customer's data is queried using a particular query predicate or predicates over various timeframes during a month or year, for example. The computer-implemented service can make this determination by analyzing aggregated queries (e.g., historical queries) to identify one or more commonly used query predicates. One of the multiple partitions of data, partitioned using a partition key corresponding to a query predicate commonly used during an identified timeframe, can be made available by the computer-implemented service to process queries. Once that timeframe has lapsed, another of the multiple partitions of data can be made available by the computer-implemented service to process queries. Thus, the described techniques can provide partitioned data corresponding to spikes in query behavior determined based on historical query behavior and/or partition data corresponding to a query predicate that is likely to occur in queries processed over a particular timeframe.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example system environment 100 that can partition data, according to at least one embodiment. The example system environment 100 can include a computer-implemented system 102. The computer-implemented system 102 can comprise various computational resources, including virtual computer instances, applications, services, processes, web servers, computer storage, database instances, networking components, and so on. In some embodiments, the computer-implemented system 102 can be hosted in the cloud by an online service provider.

The computer-implemented system 102 can comprise hosted multi-tenant provider networks. The computer-implemented system 102 can be associated with a number of networks, such as the Internet and/or one or more private networks. Clients, such as client computing devices or other interfaces, can use the network to interface with the computer-implemented system 102. Clients can include entities or individuals that contract with an operator associated with the computer-implemented system 102 to obtain computational services provided by the operator of the computer-implemented system 102. In some embodiments, the client can be resource owners, resource developers, compliance managers, other users or entities, and so on.

The computer-implemented system 102 can host raw data 104. This raw data 104 can be hosted by one or more computer-implemented storages associated with the computer-implemented system 102. In at least one embodiment, the raw data 104 is associated with a customer of the online service provider that provides the computer-implemented system 102.

The raw data 104 can be processed by a data partitioning service 106. The data partitioning service 106 can process the raw data 104 to generate a table of data. In at least one embodiment, the data partitioning service 106 is implemented by computer-executable instructions. The data partitioning service 106 can be implemented by a combination of computer-executable instructions and hardware, such as specialized hardware that includes the computer-executable instructions and one or more processors to execute the computer-executable instructions. The data partitioning service 106 can analyze the raw data 104 to determine a table schema for the raw data 104. Based on the table schema, the data partitioning service 106 can assign an identifier to each data portion in the raw data 104. For example, the raw data 104 can have several columns of data associated with columnar data of the raw data 104. The data partitioning service 106 can assign an identifier to each column of data included in the raw data 104. The data partitioning service 106 generates the table of data corresponding to the raw data 104, where the table includes the several columns of data and respective columns of data have an assigned identifier. These assigned identifiers can be associated with metadata linked to the table of data.

The data of the table can be queried. However, queries against the data of the table can be inefficient because the entirety of the data should be processed in order to return comprehensive query results. Thus, it is beneficial to partition the data. By partitioning the data, the data partitioning service 106 can limit an amount of data scanned by each query, thus improving performance and reducing cost.

A partition key or other identifier can be used to partition data in the table. The partition key should correspond to a query predicate or search term frequently associated with search requests made against the data in the table. Unfortunately, such a query predicate or other search term or phrase is often unknown to the customer providing the raw data 104 and the developer associated with the data partitioning service 106 that provides capability to query data. Therefore, customers and developers routinely select a less-than-optimum partition key to partition data in the table. One or more of the described implementations can dynamically select a partition key.

As described, the raw data 104 can be processed to generate a table of data. The table of data can be generated based on a table schema. This table schema can be stored in metadata associated with the table of data. The metadata can include identifiers associated with columns of data contained in the table of data. For example, a first identifier can be associated with a first column of data in the table of data and a second identifier can be associated with a second column of data in the table of data.

The data partitioning service 106 can subjectively or randomly select one of the first or second identifiers as the partition key or some other identifier that can be used to partition data in the table. Alternatively, a customer representative or developer of the online service provider can subjectively or randomly select one of the first or second identifiers as the partition key or some other identifier that can be used to partition the data in the table. The data partitioning service 106 can write the partition key to the metadata associated with the table of data.

The data partitioning service 106 can partition the data in the table based on the subjectively selected partition key (not illustrated). The process of partitioning the data in the table based on the subjectively selected partition key involves creating a logical split of the data into a plurality of partitions (not illustrated). In an example, each partition contains a subset of the data in the table. For example, partitioning the data in the table can involve allocating each row of the data in the table to one of the partitions determined based on the subjectively selected partition key.

Once the initial partitioning of the data in the table is achieved using the subjectively selected partition key, the data partitioning service 106 can process queries 108 against the partitioned data. Each of the queries 108 can be analyzed to determine an associated query predicate. For example, a query predicate associated with a query can be determined by analyzing a context of the query to determine a likely query predicate associated with the query. Specifically, words of the query can be parsed to determine a likely query predicate associated with the query. In another example, analysis of a query can determine that a word or phrase of the query corresponds to a query predicate. As an example, a user's query can include the natural language word pattern: "what are the sales orders for the last month." The data partitioning service 106 can analyze this natural language word pattern to determine the query predicate is likely "timestamp," based on a table of data that includes data corresponding to sales over some time or sales data accumulated in real time. In an example, the data partitioning service 106 includes a natural language translator, implemented by computer-executable instructions, to process natural language queries to generate query language, including at least a determined query predicate, recognizable by a database system hosting the data in the table. In at least one embodiment, the database system is part of the data partitioning service 106 or associated with the data partitioning service 106. In another example, the query predicate can be determined directly from the query language. In an implementation, the query language identifies the query predicate, such as when the query language is written in a predefined format or schema recognized by a database system hosting the data in the table.

Query predicates associated with the queries 108 on the data of the table can be aggregated by the data partitioning service 106. Specifically, query predicates associated with the queries 108 on the data of the table can be aggregated or collected over some period of time. In an example, the data partitioning service 106 that processes queries 108 against the partitioned data can aggregate the query predicates associated with those queries 108 over a predetermined time period, such as a time period in minutes, hours, or days. The aggregated query predicates can be analyzed by the data partitioning service 106 to determine the most commonly occurring query predicate in the aggregated query predicates.

The determined most commonly occurring query predicate can be compared to the query predicate used to partition the data in the table. The data partitioning service 106 can make such a comparison. When the query predicate used to partition the data in the table corresponds to or matches the determined most commonly occurring query predicate, the data partitioning service 106 can ascertain that the query predicate chosen to partition the data in the table was suitably chosen. However, when the query predicate used to partition the data in the table does not correspond to or match the determined most commonly occurring query predicate determined from the aggregated queries, the data partitioning service 106 can partition (i.e., repartition) the data in the table to generate a set of data partitions 118 including, for example, partitions 110-114. The number of partitions (e.g., the partitions 110-114) illustrated in FIG. 1 is one example of the number of partitions that can be generated.

The data partitioning service 106 can partition the data in the table using the determined most commonly occurring query predicate. Partitioning the data in the table using the determined most commonly occurring query predicate can involve updating metadata of the table to include a partition key 116. Specifically, the most commonly occurring query predicate, in at least one implementation, is used as the partition key 116 for the data in the table. In at least one example, the partition key 116 is used to generate the partition data 110-114 corresponding to the data of the table.

The data partitioning service 106 can provide multiple partitions of data corresponding to data in a table. The data partitioning service 106 can determine that a customer's data is queried using a particular query predicate or predicates over various timeframes during a month or year, for example. The data partitioning service 106 can make this determination by analyzing aggregated queries (e.g., historical queries), comprising the queries 108, to identify one or more commonly used query predicates. One of the multiple partitions of data, partitioned using a partition key corresponding to a query predicate commonly used during an identified timeframe, can be made available by the computer-implemented service to process queries. Once that timeframe has lapsed, another of the multiple partitions of data can be made available by the partitioning service 106 to process queries. Thus, the described techniques can provide partitioned data corresponding to spikes in query behavior determined based on historical query behavior and/or partition data corresponding to a query predicate that is likely to occur in queries processed over a particular timeframe.

Figure 2:
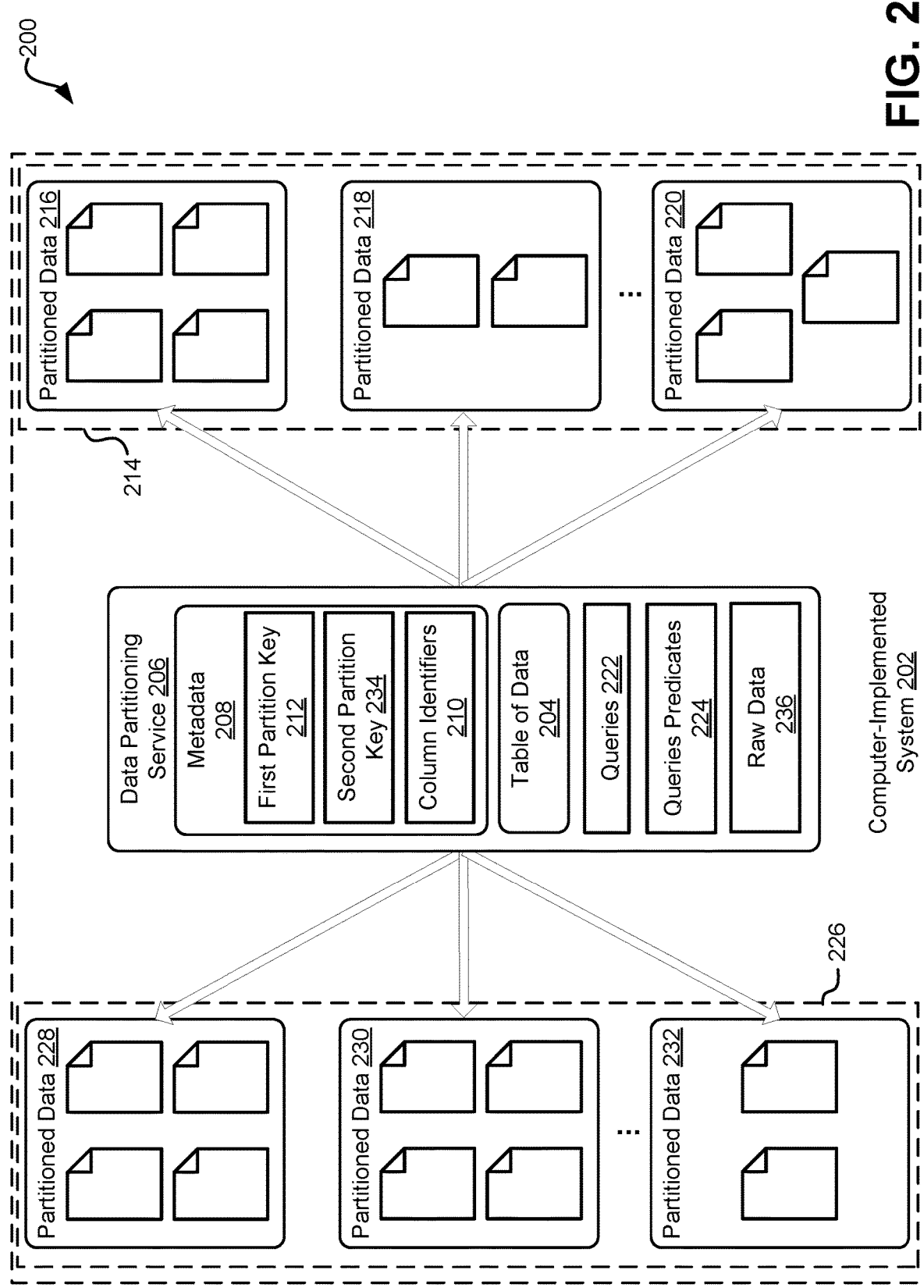
FIG. 2 illustrates another example system environment that can partition data, according to at least one embodiment.

FIG. 2 illustrates an example system environment 200 that can partition data, according to at least one embodiment. The example system environment 200 can include a computer-implemented system 202. The computer-implemented system 202 can comprise various computational resources, including virtual computer instances, applications, services, processes, web servers, computer storage, database instances, networking components, and so on. In some embodiments, the computer-implemented system 202 can be hosted in the cloud by an online service provider.

The computer-implemented system 202 can comprise hosted multi-tenant provider networks. The computer-implemented system 202 can be associated with a number of networks, such as the Internet and/or one or more private networks. Clients, such as client computing devices or other interfaces, can use the network to interface with the computer-implemented system 202. Clients can include entities or individuals that contract with an operator associated with the computer-implemented system 202 to obtain computational services provided by the operator of the computer-implemented system 202. In some embodiments, the client can be resource owners, resource developers, compliance managers, other users or entities, and so on.

A table of data 204, also referred to as table 204, can be processed by a data partitioning service 206. In at least one embodiment, the table of data 204 is generated from raw data 236. In at least one embodiment, the data partitioning service 206 is implemented by computer-executable instructions. The data partitioning service 206 can be implemented by a combination of computer-executable instructions and hardware, such as specialized hardware that includes the computer-executable instructions and one or more processors to execute the computer-executable instructions. The data partitioning service 206 can access onboard computer-implemented storage. Alternatively, or in addition, the data partitioning service 206 can access external computer-implemented storage, such as computer-implemented storage provided by the computer-implemented system 202. Described data, such as queries, data in a table, metadata, partition data, and so forth, can be stored in computer-implemented storage by one or both of the data partitioning service 206 and the computer-implemented system 202.

The data partitioning service 206 can generate the table of data 204 based on a table schema. Based on the table schema, the data partitioning service 206 can assign an identifier to each data portion included in the table of data 204. For example, the table of data 204 can have several columns of data and rows of data that span the columns of data. The data partitioning service 206 can assign an identifier to each column of data included the table of data 204. In at least one embodiment, the data partitioning service 206 generates the table of data 204 based on analysis of the raw data 236, where the table of data 204 includes several columns of data and respective columns of data have an assigned identifier. These assigned column identifiers 210 can be associated with metadata 208, which is linked to the table of data 204. The foregoing description of the table of data 204 and its associated identifiers suggests that the table of data 204 is to be horizontally partitioned. One or more of the described embodiments are not limited to horizontal partitioning. Rather, one or more of the described embodiments can support vertical partitioning and functional partitioning as well.

The data of the table 204 can be queried. However, queries against the data of the table 204 can be inefficient because the entirety of the data should be processed in order to return comprehensive query results. Thus, it is beneficial to partition table of data 204. By partitioning the data, the data partitioning service 206 can limit an amount of data caused to be scanned by each query, thus improving performance and reducing cost.

A partition key or other identifier can be used to partition the table of data 204. The partition key should correspond to a query predicate or search term that will occur frequently in search requests made against the table of data 204. Unfortunately, such a query predicate or other search term or phrase is often unknown to a customer and/or the developer associated with the computer-implemented service 202 that provides capability to query data. Therefore, customers and developers routinely select a less-than-optimum partition key to partition the table of data 204. One or more of the described embodiments can dynamically select a partition key.

The data partitioning service 206 can subjectively or randomly select one of the column identifiers 210 as a partition key (i.e., first partition key 212) or some other identifier that can be used to partition data in the table of data 204. Alternatively, a customer representative or developer of an online service provider associated with the computer-implemented system 202 can subjectively or randomly select one of the first or second identifiers as the first partition key 212 or some other identifier that can be used to partition the data in the table of data 204. The data partitioning service 206 can write the first partition key 212 to the metadata 208 associated with the table of data 204.

The data partitioning service 206 can partition the data in the table 204 based on the first partition key 212. The process of partitioning the data in the table 204 based on the first partition key 212 involves creating a logical split of the data in the table 204 into a plurality of partitions 214 including partitioned data 216-220. In an example, each partitioned data 216-220 contains a subset of the data in the table 204. For example, partitioning the data in the table 204 can involve allocating each row of the data in the table to one of the partitions 216-220 determined based on the first partition key 212.

Once the initial partitioning of the data in the table 204 is achieved using the subjectively selected partition key (i.e., the first partition key 212), the data partitioning service 206 can process queries 222 against the partitions 214. Each of the queries 222 can be analyzed to determine an associated query predicate. For example, a query predicate associated with a query of the queries 222 can be determined by analyzing a context of the query to determine a likely query predicate associated with the query. Specifically, words of the query can be parsed to determine a likely query predicate associated with the query. In another example, analysis of a query can determine that a word or phrase of the query corresponds to a query predicate. As an example, a user's query can include the natural language word pattern: "what are the sales orders for the last month." The data partitioning service 206 can analyze this natural language word pattern to determine the query predicate is likely "timestamp," based on a table of data, such as the table 204, that includes data corresponding to sales over some time or sales data accumulated in real time. In at least one embodiment, the data partitioning service 206 includes a natural language translator, implemented by computer-executable instructions, to process natural language queries to generate query language, including at least a determined query predicate, recognizable by a database system, such as a system associated with the data partitioning service 206 and/or the computer-implemented system 202, hosting the data in the table 204. In at least one embodiment, the query predicate can be determined directly from the query language of one or more of the queries 222. In an implementation, the query language identifies the query predicate, such as when the query language is written in a predefined format or schema recognized by a database system hosting the data in the table 204.

Query predicates 224, determined as described herein, associated with the queries 222 on the data of the table 204 and/or the partitions 214 can be aggregated. The data partitioning service 206 can generate the aggregated query predicates (i.e., the query predicates 224). Specifically, the query predicates 224 associated with queries 222 on the data of the table 204 and/or the partitions 214 can be aggregated or collected over some period of time. In an example, the data partitioning service 206 that processes the queries 222 against the data of the table 204 and/or the partitions 214 can aggregate the query predicates 224 associated with those queries 222 over a predetermined time period, such as a time period in minutes, hours, or days. The aggregated query predicates 224 can be analyzed by the data partitioning service 206 to determine the most commonly occurring query predicate in the aggregated query predicates 224.

The determined most commonly occurring query predicate can be compared to the first partition key 212 used to generate the partitions 214. The data partitioning service 206 can make such a comparison. When the first partition key 212 used to partition the data in the table 204 corresponds to or matches the determined most commonly occurring query predicate, the data partitioning service 206 can ascertain that the first partition key 212 chosen to partition the data in the table 204 was suitably chosen. However, when the first partition key 212 used to partition the data in the table 204 does not correspond to or match the determined most commonly occurring query predicate determined from the aggregated queries 222, the data partitioning service 206 can partition (i.e., repartition) the data in the table 204 to generate partitions 226, including partitioned data 228-232.

The data partitioning service 206 can partition the data in the table 204 using the determined most commonly occurring query predicate. Partitioning the data in the table 204 using the determined most commonly occurring query predicate can involve updating metadata 208 of the table 204 to include a second partition key 234. Specifically, the most commonly occurring query predicate, in at least one embodiment, is used as the second partition key 234 for the data in the table 204. In at least one example, the second partition key 234 is used to generate the partitions 226 corresponding to the data of the table 204. In at least one embodiment, the partitions 214 are retained, thereby providing two sets of partitioned data (i.e., partitions 214 and partitions 226). The number of illustrated partition keys and/or the number of illustrated partitions can be greater than or less than those that are illustrated and described hereby.

The data partitioning service 206 can maintain multiple partitions of data corresponding to data in the table 204, such as at least the partitions 214 and 226. The data partitioning service 206 can determine that a customer's data is queried using a particular query predicate or predicates over various timeframes, such over a particular day or days each month or one or more hours some of the days during the month. The data partitioning service 206 can make this determination by analyzing the aggregated queries 222 (e.g., historical queries) to identify one or more commonly used query predicates. One of the multiple partitions of data (e.g., partition 214 or 226), partitioned using a partition key (e.g., first or second partition key 212, 234) corresponding to a query predicate commonly used during an identified timeframe, can be made available by the data partitioning service 206 to process queries. In at least one embodiment, the data partitioning service 206 can partition data in the table 204 based on one or more identified commonly used query predicates. Once that timeframe has lapsed, another of the multiple partitions of data can be made available by the data partitioning service 206 to process queries. Thus, the described techniques can provide partitioned data corresponding to spikes in query behavior determined based on historical query behavior and/or partition data corresponding to a query predicate that is likely to occur in queries processed over a particular timeframe. In at least one embodiment, the data partitioning service 206 is associated with a database system, such as Hive, Apache Iceberg, Glue, and so forth.

In at least one embodiment, a data retention threshold or parameter can be established or selected by a customer and/or developer associated with the computer-implemented system 102 or 202. The data retention threshold or parameter can be linked to partitioned data such as partition 214, 226, and/or 118. In at least one embodiment, the data retention threshold or parameter specifies a length of time for retaining partitioned data. For example, the data retention threshold or parameter can specify a length of time for retaining partitioned data in minutes, hours, days, or some other time period. When the length of time lapses, in at least one embodiment, partitioned data linked to the data retention threshold or parameter can be removed from the computer-implemented system or caused to be persisted in computer-implemented storage. In at least one embodiment, when the length of time lapses, partitioned data linked to the data retention threshold or parameter can be moved from volatile computer-implemented storage to nonvolatile computer-implemented storage.

In at least one embodiment, the data retention threshold or parameter corresponds to usage of partitioned data such as partition 214, 226, and/or 118. For example, the data retention threshold or parameter can specify a reads and/or writes value. This data retention threshold or parameter specifying the reads and/or writes value can be linked to partitioned data. A service, such as the data partitioning service 106 and/or 206, can log reads and/or writes against partitioned data and periodically, based on a defined schedule, compare the logged reads and/or writes against the data retention threshold or parameter specifying the reads and/or writes value. When the logged reads and/or writes are not at least equal to the data retention threshold or parameter specifying the reads and/or writes value, the service can delete or persist the partitioned data linked to the data retention threshold or parameter specifying the reads and/or writes value. However, when the logged reads and/or rights are at least equal to the data retention threshold or parameter specifying the reads and/or writes value, the service can maintain, in computer-implemented storage, the partitioned data linked to the data retention threshold or parameter specifying the reads and/or writes value.

FIG. 3 illustrates data of a table 300 that can be partitioned according to at least one embodiment. While the table 300 is illustrated and described to include a particular formatting, certain data, etc., it should be understood that the described embodiments can partition data that is formatted differently than described and illustrated. Moreover, it is to be understood that the described embodiments can partition data in any quantity and in any format.

In at least one embodiment, the table 300 is generated and/or processed using the computer-implemented system 102 or the computer-implemented system 202. The data of the table 300 can be partitioned to generate partitions 302, comprising partitioned data 304-308. In at least one embodiment, the partitions 302 are generated based on a subjectively or randomly selected partition key. In particular, the partitions 302 are partitioned using the column identifier "Department" as the partition key. In at least one embodiment, the partition key "Department" is selected randomly by a data partitioning service, such as the data partitioning service 106 or the data partitioning service 206. Alternatively, the partition key "Department" can be subjectively chosen by a customer that provided the data of the table 300 or a data scientist of an online service provider.

Based on the partition key "Department," the system partitions the data of the table 300 to generate the partitioned data 304-308. Specifically, the partitioned data 304 can include the data from the first row and the fourth row of the table 300. The partitioned data 306 can include the data from the second row of the table 300, and the partitioned data 308 can include the data from the third row of the table 300. The table 300 is partitioned so that queries associated with the query predicate "Department" are optimized. However, according to at least one embodiment, analysis of queries can indicate that queries against the data of the table 300 can be optimized if the data of the table 300 is partitioned based on the column identifier "Hire Year."

In at least one embodiment, data of the table 300 is partitioned (e.g., repartitioned) based on the analysis of the queries to generate partitions 310, including partitioned data 312-316. Specifically, the partitions 310 are partitioned using the column identifier "Hire Year" as the partition key. In this example, the partition 312 can include the data from the first row and the third row of the table 300. The partition 314 can include the data from the second row of the table 300, and the partition 316 can include the data from the fourth row of the table 300.

Figure 4:
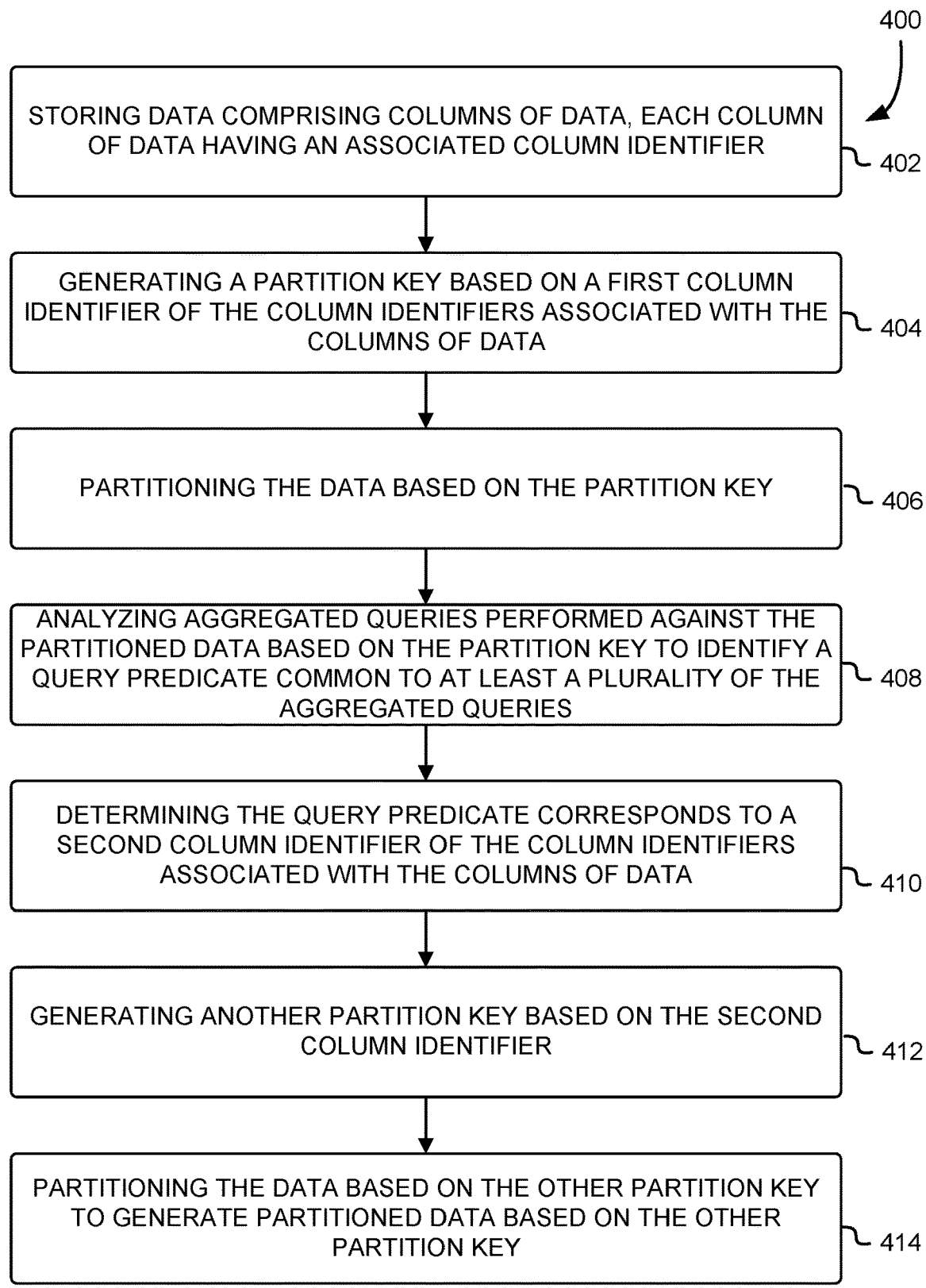
FIG. 4 illustrates an example flow diagram that may be associated with one or more of the described system environments to generate partitioned data, according to at least one embodiment.

FIG. 4 illustrates an example flow diagram 400 that may be associated with one or more of the described system environments to generate partitioned data, according to at least one embodiment. In some implementations, the acts of the flow diagram 400 are executed by one or more computing devices of the example system environments described herein. The example system environments may execute computer-executable instructions incorporating at least some of the processing acts of the flow diagram 400 to provide generation and use of partitioned data according to at least one of the embodiments described herein.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts, and modules can be implemented in hardware, software, firmware, special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules might be implemented in software, in firmware, in special-purpose digital logic, and any combination thereof.

At 402, data is stored. In at least one embodiment, the data comprises columns of data. Each column of data can have an associated column identifier. In at least one embodiment, the data is associated with a table. For example, the data can be associated with the table of data 204. The table of data 204 can be generated from raw data, such as the raw data 104 or raw data 236. In at least one embodiment, the column identifiers can be included in metadata. For example, the column identifiers can be included in the metadata 208. In at least one embodiment, a data partitioning service stores the data. The data partitioning service can correspond to the data partitioning service 106 or the data partitioning service 206.

At 404, a partition key is generated. In at least one embodiment, the generated partition key corresponds to the partition key 116 or the first partition key 212. In at least one embodiment, the partition key is generated based on a first column identifier of a plurality of column identifiers associated with columns of data. In at least one embodiment, the partition key is generated from column identifiers included in metadata, such as the metadata 208. In at least one embodiment, the partition key is generated by the data partitioning service 106 or the data partitioning service 206.

At 406, the data is processed to partition the data based on the partition key. In at least one embodiment, the data partitioning service 106 or the data partitioning service 206 partitions the data to generate partitions 118 or partitions 214. In at least one embodiment, the partitions are generated from a table of data, such as the table of data 204. In at least one embodiment, the data partitioning service 106 or the data partitioning service 206 perform the partitioning of the data.

At 408, aggregated queries are analyzed. In at least one embodiment, the aggregated queries are generated from queries against partitioned data generated from a randomly or subjectively chosen partition key. In at least one embodiment, analysis of the aggregated queries is to determine a query predicate common to or associated with at least a plurality of the aggregated queries. In at least one embodiment, the data partitioning service 106 or the data partitioning service 206 aggregates queries against the partitioned data. In at least one embodiment, the data partitioning service 106 or the data partitioning service 206 determines the query predicate common to or associated with at least a plurality of aggregated queries.

At 410, it is determined that the query predicate common to or associated with at least a plurality of the aggregated queries corresponds to a second column identifier of the column identifiers associated with the columns of data. In at least one embodiment, the correspondence is determined by analyzing metadata associated with the table of data. In at least one embodiment, the correspondence is determined by analyzing the metadata 208 associated with the table of data 204. In at least one embodiment, the query predicate common to or associated with at least a plurality of the aggregated queries is determined by the data partitioning service 106 or the data partitioning service 206.

At 412, another partition key is generated. In at least one embodiment, the other partition key is generated based on the second column identifier. In at least one embodiment, the other partition key is generated based on the second column identifier comprised in metadata of the table of data. In at least one embodiment, the metadata 208 of the table of data 204 comprises the second column identifier. In at least one embodiment, the other partition key is associated with the metadata 208. The other partition key can replace a partition key already included in the metadata. Alternatively, the other partition key can be added to the metadata, resulting in multiple partition keys being associated with the metadata.

At 414, data of the table is partitioned based on the other partition key. Partitioning of the data can generate partition data based on the other partition key. In at least one embodiment, the partitioned data based on the other partition key corresponds to the partitions 226 or partitions 310.

Additional acts can be associated with the flow diagram 400. One or more computer-implemented aspects of the computer-implemented systems 102 and/or 202 can implement the acts of the flow diagram 400 and/or the additional acts described in the following. Queries can be stored, such as in computer-implemented storage, over a predetermined duration to generate the aggregated queries. In at least one embodiment, the aggregated queries are analyzed to determine a percentage corresponding to a determined number of times the query predicate was determined to be associated with the queries stored over the predetermined duration. In at least one embodiment, the percentage is compared against a percentage threshold. In at least one embodiment, based on determining the percentage at least equals the percentage threshold, data associated with a table of data can be partitioned based on the other partition key to generate partitioned data. In at least one embodiment, as described, the other partition key corresponds to the second partition key 234 or the partition key 116. In at least one embodiment, queries are processed against the partition data based on the other partition key for a duration corresponding to a predetermined duration. A determination can be made that the duration has lapsed. In at least one embodiment, based on the determination that the duration has lapsed, queries can be processed against the partitioned data based on the partition key. In at least one embodiment, the predetermined duration corresponds to a determined time period during which historical queries against the partitioned data based on the other partition key are at least two times greater than queries against the partitioned data based on the partition key. In at least one embodiment, the partition key corresponds to the first partition key 212 and the other partition key corresponds to the second partition key 234.

Figure 5:
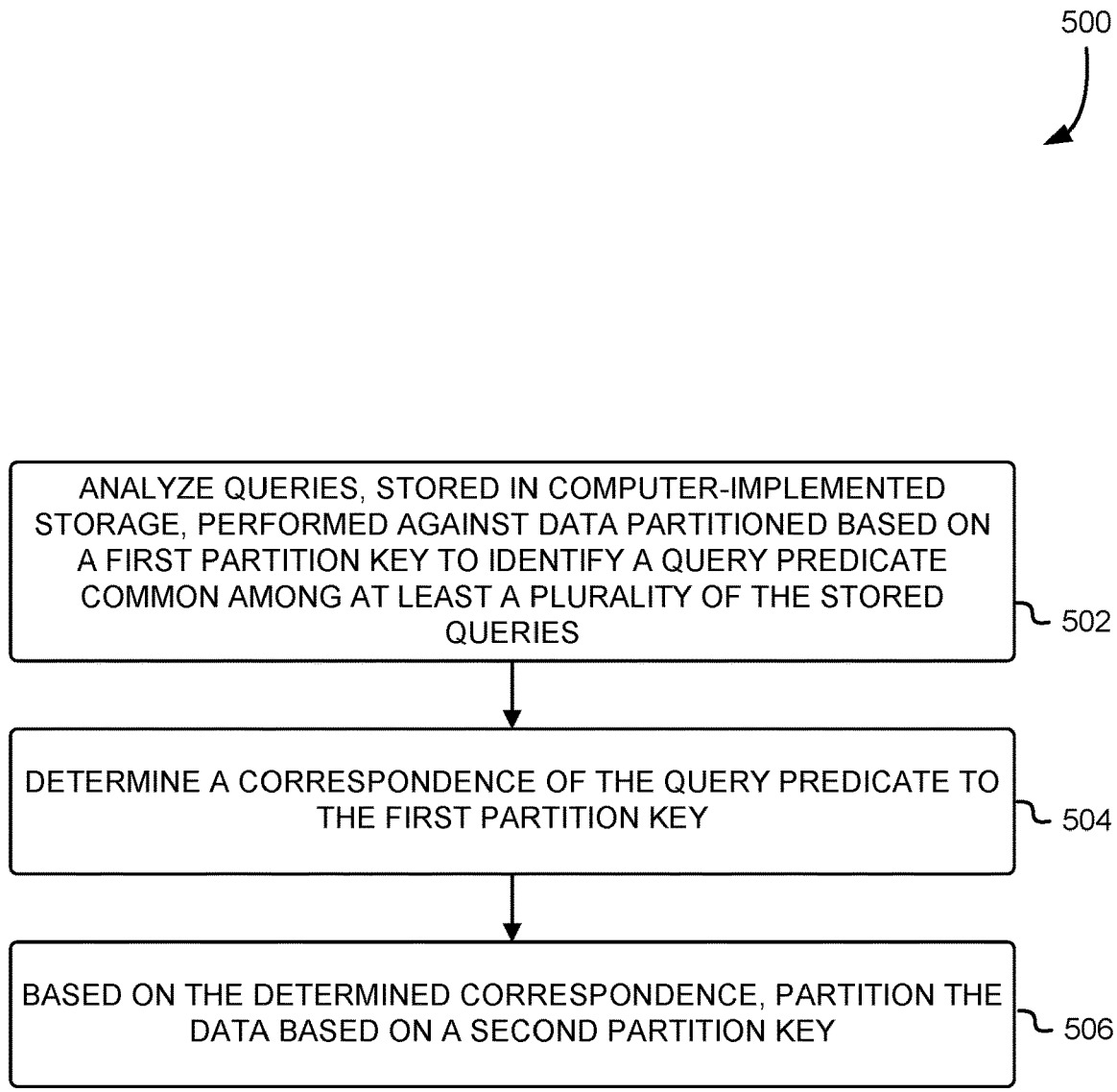
FIG. 5 illustrates an example flow diagram that may be associated with one or more of the described system environments to generate partitioned data, according to at least one embodiment.

FIG. 5 illustrates an example flow diagram 500 that may be associated with one or more of the described system environments to generate partitioned data, according to at least one embodiment. In some implementations, the acts of the flow diagram 500 are executed by one or more computing devices of the example system environments described herein. The example system environments may execute computer-executable instructions incorporating at least some of the processing acts of the flow diagram 500 to provide generation and use of partitioned data, according to at least one of the embodiments described herein.

At 502, queries, such as aggregated queries stored in computer-implemented storage, are analyzed. In at least one embodiment, at least a portion of the aggregated queries were performed on data partition based on a first partition key. In at least one embodiment, the queries are analyzed to determine a query predicate common among or associated with at least a plurality of the stored queries. In at least one embodiment, the data partitioning service 106 or the data partitioning service 206 can perform the query analysis. In at least one embodiment, the first partition key corresponds to the first partition key 212. In at least one embodiment, the data partition based on the first partition key corresponds to the partitions 214.

At 504, a correspondence of the query predicate to the first partition key is determined. In at least one embodiment, the correspondence is determined by the data partitioning service 106 or the data partitioning service 206. In at least one embodiment, determining the correspondence comprises determining the query predicate is associated with a second partition key rather than a first partition key. In at least one embodiment, the second partition key corresponds to the second partition key 234 or the partition key 116, and the first partition key corresponds to the first partition key 212.

At 506, the data is partitioned based on the second partition key. In at least one embodiment, the data is partitioned based on the determined correspondence. In at least one embodiment, the data partitioned based on the second partition key corresponds to the data of partitions 226 and/or partitions 310.

Additional acts can be associated with the flow diagram 500. For example, the first partition key can be generated based on an identifier associated with a first structured data set of the data. The identifier can be associated with metadata of a table of data. The metadata can correspond to the metadata 208 and the table of data can correspond to the table of data 204. Similarly, the second partition key can be generated based on an identifier associated with a second structured data set of the data. Similarly, the identifier can be associated with metadata of a table of data. In at least one embodiment, the first structured data set of the data corresponds to a column of data in a table. The second structured data set of the data can correspond to another column of data in the table.

In at least one embodiment, the queries, such as aggregated queries, can be analyzed to determine a percentage corresponding to a determined number of times the query predicate was found to be associated with queries over a predetermined duration. In at least one embodiment, the aggregated queries correspond to the queries 108 or queries 222. In at least one embodiment, the query predicate can be determined from a collection of query predicates. For example, the query predicate can be determined from aggregated query predicates 224. In at least one embodiment, when the determined percentage at least equals the percentage threshold, the second partition key is used to partition data in a table. In at least one embodiment, the second partition key corresponds to the partition key 116 or the second partition key 234. In at least one embodiment, the partitioned data based on the second partition key corresponds to data of the partitions 118, 226, or 310. In at least one embodiment, real-time queries can be processed against the data partitioned based on the second partition key for a duration corresponding to a predetermined duration. In at least one embodiment, once the duration has lapsed, additional real-time queries can be processed against partitioned data based on the first partition key. In at least one embodiment, the first partition key corresponds to the first partition key 212, and the partitioned data corresponds to partitions 214 or partitions 302.

Figure 6:
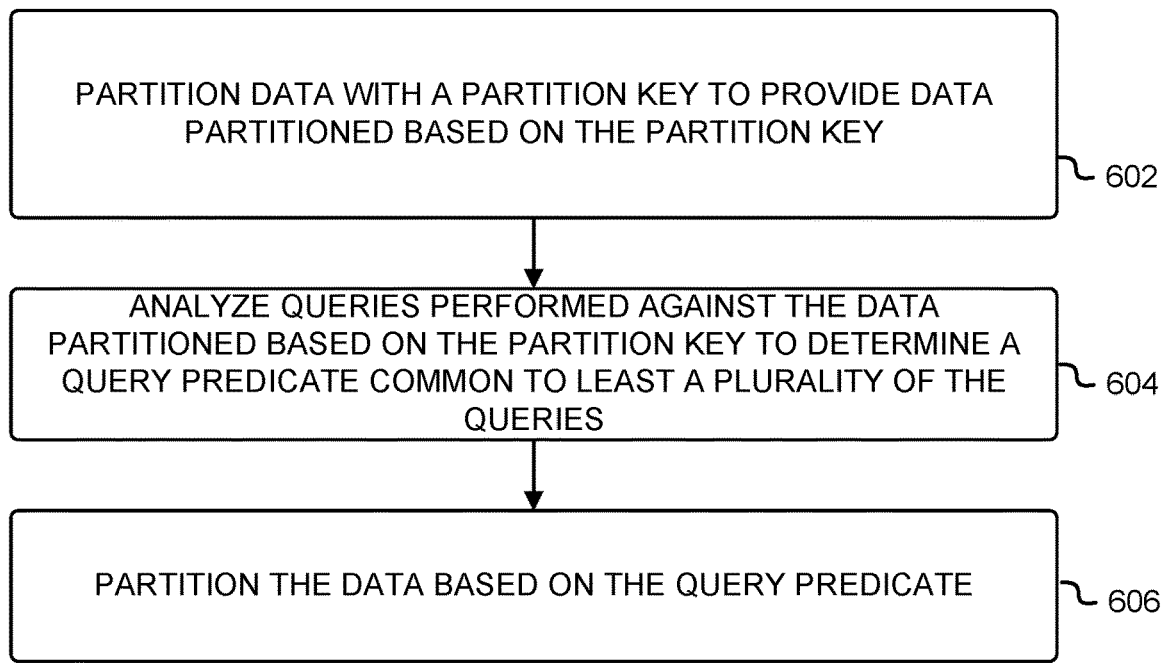
FIG. 6 illustrates an example flow diagram that may be associated with one or more of the described system environments to generate partitioned data, according to at least one embodiment.

FIG. 6 illustrates an example flow diagram 600 that may be associated with one or more of the described system environments to generate partitioned data, according to at least one embodiment. In some implementations, the acts of the flow diagram 600 are executed by one or more computing devices of the example system environments described herein. The example system environments may execute computer-executable instructions incorporating at least some of the processing acts of the flow diagram 600 to provide generation and use of partitioned data, according to at least one of the embodiments described herein.

At 602, data is partitioned. In at least one embodiment, the data is associated with a table of data, such as the table of data 204. In at least one embodiment, the data is partitioned using a partition key to generate partitioned data such as that of the partitions 214 or partitions 302. In at least one embodiment, the partition key corresponds to the first partition key 212. In at least one embodiment, the data is partitioned by the data partitioning service 106 or the data partitioning service 206. In at least one embodiment, the partition key is a randomly or subjectively selected partition key.

At 604, queries are analyzed. In at least one embodiment, the queries are analyzed to determine a query predicate that is common to or at least associated with a plurality of the queries. In at least one embodiment, the analyzed queries correspond to the queries 108 or the queries 222. In at least one embodiment, query predicates determine from analyzing the queries can be stored in the computer-implemented storage containing the query predicates 224.

At 606, the data is partitioned (e.g., repartitioned) based on the query predicate determined to be common to or at least associated with the plurality of queries. In at least one embodiment, the query predicate is used to establish a partition key. This partition key can correspond to the partition key 116 or the second partition key 234. The partition key can be associated with an identifier of structured data comprised in a table of data. The structured data can correspond to columns of data in the table of data. In at least one embodiment, the table of data corresponds to the table of data 204. In at least one embodiment, the data partitioning service 106 or the data partitioning service 206 partitions the data. In at least one embodiment, the partitioned data can be associated with the partitions 118, 226, or 310.

Additional acts can be associated with the flow diagram 600. In at least one embodiment, metadata can be analyzed based on the query predicate to select another partition key. In at least one embodiment, the other partition key is selected based on one or more column identifiers associated with the metadata. In at least one embodiment, the metadata can correspond to the metadata 208. In at least one embodiment, the other partition key is used to generate the partitions 118, 226, or 310. In at least one embodiment, the data partitioning service 106 or the data partitioning service 206 generate the partitions 118, 226, or 310.

In at least one embodiment, queries are analyzed to determine a percentage corresponding to a determined number of times the query predicate was found to be associated with the queries over a predetermined duration. In at least one embodiment, the queries analyzed correspond to the queries 108 or the queries 222. The query predicate can be determined from aggregated query predicates, such as those included in the query predicates 224. In at least one embodiment, when the percentage at least equals the percentage threshold, data is partitioned based on the query predicate. In at least one embodiment, the query predicate is established as a partition key used to partition the data. In at least one embodiment, the established partition key corresponds to the partition key 116 or the second partition key 234.

In at least one embodiment, an act of the flow diagram 600 corresponds to processing first real-time queries against the data partition based on the query predicate for a duration corresponding to a predetermined duration. In at least one embodiment, the first real-time queries are processed against partitions 118, 226, or 310. Once the duration has terminated or lapsed, additional real-time queries, such as second real-time queries, are processed against data partitioned based on the partition key. In at least one embodiment, the partition key corresponds to the first partition key 212, and the partitioned data corresponds to the data of partitions 214 or partitions 302.

Figure 7:
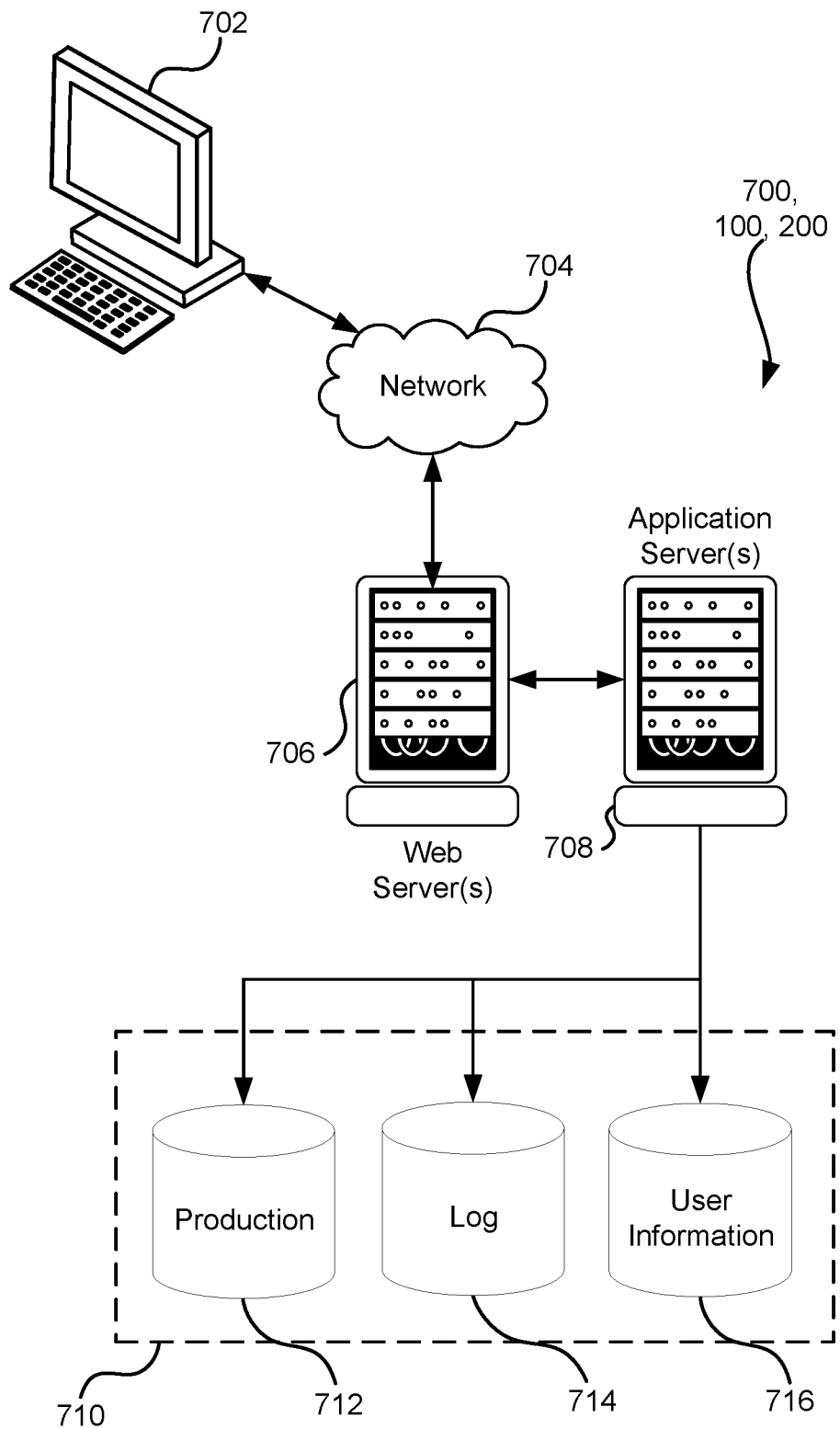
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update, or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as JavaR, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors; and
memory that stores computer-executable instructions that are executable by the one or more processors to cause the system to:
analyze queries, stored in computer-implemented storage, performed against data partitioned based on a first partition key to identify a query predicate common among at least a plurality of the stored queries;
analyze the queries to determine a percentage corresponding to a determined number of times the query predicate was found to be associated with the queries over a predetermined duration;
identify a threshold based, at least in part, on identifying the query predicate common among at least the plurality of stored queries;
determine a correspondence of the query predicate to the first partition key; and
based on determining the percentage at least equals a percentage threshold, the identified threshold, and the determined correspondence, partition the data based on a second partition key.

2. The system of claim 1, wherein the memory that stores the computer-executable instructions that are executable by the one or more processors are further to cause the system to:
generate the first partition key based on an identifier associated with a first structured data set of the data; and
generate the second partition key based on an identifier associated a second structured data set of the data,
wherein the second partition key corresponds to the query predicate.

3. The system of claim 2, wherein the first structured data set is a first column of data comprised in the data and the second structured data set is a second column of data comprised in the data.

4. The system of claim 1, wherein determining the correspondence of the query predicate to the first partition key comprises determining the query predicate is associated with the second partition key rather than the first partition key.

5. The system of claim 1, wherein determining the correspondence of the query predicate to the first partition key comprising determining the query predicate does not match the first partition key.

6. The system of claim 1, wherein the memory that stores the computer-executable instructions that are executable by the one or more processors are further to cause the system to:
process first real-time queries against the data partitioned based on the second partition key for a duration corresponding to the predetermined duration;
determine the duration has lapsed; and
based on determining the duration has lapsed, process second real-time queries against the data partitioned based on the first partition key.

7. The system of claim 6, wherein the memory that stores the computer-executable instructions that are executable by the one or more processors are further to cause the system to:
determine the predetermined duration from a set of historical queries processed against the data partitioned based on the first partition key.

8. A system, comprising:
one or more processors; and
memory that stores computer-executable instructions that are executable by the one or more processors to cause the system to:
partition data with a partition key to provide data partitioned based on the partition key;
analyze queries performed against the data partitioned based on the partition key to determine a query predicate common to least a plurality of the queries;
identify a threshold based, at least in part, on identifying the query predicate common among at least the plurality of the queries;
based, at least in part, on the identified threshold, partition the data based on the query predicate; and
process first real-time queries against the data partitioned based on the query predicate for a duration corresponding to a predetermined duration.

9. The system of claim 8, wherein partitioning the data based on the query predicate provides data partitioned based on another partition key associated with the query predicate, the other partition key derived from an identifier for columnar data comprised in the data.

10. The system of claim 8, wherein the memory that stores the computer-executable instructions that are executable by the one or more processors are further to cause the system to:
analyze metadata based on the query predicate to select another partition key, the metadata associated with the data,
wherein partitioning the data based on the query predicate comprises partitioning the data using the other partition key.

11. The system of claim 10, wherein the metadata comprises the partition key and a plurality of identifiers associated with structured data comprised in the data, and wherein the other partition key is determined from one of the plurality of identifiers.

12. The system of claim 8, wherein the memory that stores the computer-executable instructions that are executable by the one or more processors are further to cause the system to:
analyze the queries to determine a percentage corresponding to a determined number of times the query predicate was found to be associated with the queries over a predetermined duration; and
based on determining the percentage at least equals a percentage threshold, partition the data based on the query predicate.

13. The system of claim 8, wherein the memory that stores the computer-executable instructions that are executable by the one or more processors are further to cause the system to:
- subsequent to termination of the duration, process second real-time queries against the data partitioned based on the partition key.

14. The system of claim 8, wherein the partition key is a randomly selected partition key corresponding to at least one identifier comprised in a logical schema for the data.

* * * * *